(12) United States Patent
Uto et al.

(10) Patent No.: US 9,828,902 B2
(45) Date of Patent: Nov. 28, 2017

(54) COOLING CONTROL SYSTEM FOR INTERNAL COMBUSTION ENGINE

(71) Applicant: HONDA MOTOR CO., LTD., Tokyo (JP)

(72) Inventors: Hajime Uto, Wako (JP); Yosuke Yamada, Wako (JP); Kosuke Ihara, Wako (JP); Yoshikazu Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 54 days.

(21) Appl. No.: 14/938,090

(22) Filed: Nov. 11, 2015

(65) Prior Publication Data

US 2016/0131017 A1    May 12, 2016

(30) Foreign Application Priority Data

Nov. 12, 2014 (JP) ................. 2014-229481

(51) Int. Cl.
    *F01P 5/12* (2006.01)
    *F01P 3/12* (2006.01)
    *F02B 29/04* (2006.01)

(52) U.S. Cl.
    CPC ................... *F01P 5/12* (2013.01); *F01P 3/12* (2013.01); *F02B 29/0443* (2013.01); *F02B 29/0493* (2013.01); *Y02T 10/146* (2013.01)

(58) Field of Classification Search
    CPC ........ F01P 5/12; F01P 3/20; F01P 3/12; F01P 7/14; F01P 7/16; F01P 7/162; F01P 7/164;

(Continued)

(56) References Cited

U.S. PATENT DOCUMENTS 7,806,091 B2 * 10/2010 Esau .................... F02B 29/0412
                                                              123/41.29
8,746,185 B2 *  6/2014 Teraya .................. B60W 10/06
                                                              123/41.02
(Continued)

FOREIGN PATENT DOCUMENTS

CN         1277928 A      12/2000
CN       101198776 A       6/2008
(Continued)

OTHER PUBLICATIONS

German Search Report application No. 10 2015 222 232.2 dated Jul. 6, 2016.

(Continued)

*Primary Examiner* — Grant Moubry
(74) *Attorney, Agent, or Firm* — Squire Patton Boggs (US) LLP

(57) ABSTRACT

A cooling control system for an internal combustion engine, which is capable of circulating engine coolant while suppressing power consumption by an engine coolant pump as much as possible. The cooling control system is provided for cooling intake gases increased in temperature by being pressurized by a supercharger. The engine coolant pump of the electrically-driven type delivers engine coolant to thereby cause the same to circulate. An ECU controls, when a difference between the temperature of the engine coolant and a first target temperature is not larger than a first predetermined value, the amount of the engine coolant to be delivered to a predetermined minimum flow rate, and controls, when the difference is larger than the first predetermined value, the amount of the engine coolant to be delivered such that it becomes larger as the difference is larger.

1 Claim, 6 Drawing Sheets

(58) Field of Classification Search
CPC .... F01P 7/167; F01P 2060/02; F01P 2037/00;
F01P 2025/08; F01P 2025/52; F01P
2023/00; F02B 29/04; F02B 29/0443;
F02B 29/0493; F02B 39/00; F02M 26/02;
F02M 26/03; F02M 26/04; F02M 26/17;
F02M 26/22; F02M 26/28; F02M 31/20;
Y02T 10/146
See application file for complete search history.

(56) References Cited

U.S. PATENT DOCUMENTS

| | | | | |
|---|---|---|---|---|
| 9,212,630 | B2* | 12/2015 | Peters | F02D 41/0055 |
| 9,394,858 | B2* | 7/2016 | Richards | F02M 31/205 |
| 2002/0195090 | A1* | 12/2002 | Marsh | F01P 7/165 |
| | | | | 123/563 |
| 2008/0271721 | A1* | 11/2008 | Wikstrom | F02B 29/0425 |
| | | | | 123/568.12 |
| 2011/0225955 | A1* | 9/2011 | Kimura | F01N 3/101 |
| | | | | 60/278 |
| 2013/0276765 | A1* | 10/2013 | Moffat | F02M 25/07 |
| | | | | 123/568.12 |
| 2015/0275742 | A1 | 10/2015 | Chekaiban et al. | |
| 2016/0123214 | A1 | 5/2016 | Kim | |

FOREIGN PATENT DOCUMENTS

| | | | | |
|---|---|---|---|---|
| CN | 102410111 A | 4/2012 | | |
| DE | 10224063 A1 | 12/2003 | | |
| DE | 102010048997 A1 | 5/2011 | | |
| DE | 102012223069 A1 | 6/2014 | | |
| DE | 102014203985 A1 | 9/2014 | | |
| DE | 102015113476 A1 | 5/2016 | | |
| EP | 2375035 A1 * | 10/2011 | ......... | F02D 41/0002 |
| JP | 2011-214544 A | 10/2011 | | |
| JP | 2014-156804 A | 8/2014 | | |
| WO | 2012/032614 A1 | 3/2012 | | |

OTHER PUBLICATIONS

Japanese Office Action application No. 2014-229481 dated May 31, 2016.

Chinese Office Action application No. 201510754088.0 dated Aug. 1, 2017.

\* cited by examiner

COOLING CONTROL SYSTEM FOR INTERNAL COMBUSTION ENGINE

BACKGROUND OF THE INVENTION

Field of the Invention

The present invention relates to a cooling control system for an internal combustion engine that includes a supercharger, the cooling control system being provided for cooling intake gases which have been increased in temperature by being pressurized by the supercharger.

Description of the Related Art

In general, in an internal combustion engine equipped with a supercharger, a cooling control system including an intercooler cools intake air which has been increased in temperature by being pressurized by a supercharger, in order to avoid occurrence of knocking or the like while ensuring improvement of power output. Conventionally, as a cooling control system of this kind, there has been known one disclosed e.g. in Japanese Laid-Open Patent Publication (Kokai) No. 2014-156804. This cooling control system includes an intercooler of the water cooled type, a radiator, an engine coolant passage for connection therebetween, and an electric pump that delivers engine coolant to circulate the same. The intercooler is disposed in an intake passage of the engine at a location downstream of a compressor of the supercharger, and engine coolant is circulated between the intercooler and the radiator by operation of the electric pump. With this, intake air pressurized by the supercharger and passing through the intercooler in the intake passage is cooled by heat exchange with the engine coolant to become lower in temperature.

Further, the above-mentioned engine is equipped with an EGR device for recirculating part of exhaust gases discharged into an exhaust passage (hereinafter referred to as the "EGR gases") to an upstream side of the intercooler in the intake passage. Therefore, when EGR (exhaust gas recirculation) is being performed, the intake air and the EGR gases (hereinafter, collectively referred to as the "intake gases") are cooled via the intercooler, and are introduced into cylinders of the engine in a state lowered in temperature.

The EGR gases usually includes a relatively large amount of water vapor, and hence if the intake gases are excessively cooled by the intercooler, the water vapor in the intake gases is condensed when the intake gases pass though the intercooler, whereby condensed water is sometimes generated in the intake passage. When such condensed water is attached to a component part of an intake system including the intercooler, the component part can be corroded. To avoid this inconvenience, in the above-described cooling control system, the temperature of the intake gases at an outlet of the intercooler (hereinafter referred to as the "outlet temperature"), that is, the temperature of the intake gases cooled by the intercooler is compared with the dew-point temperature at that time are compared, and the outlet temperature is controlled such that it becomes higher than the dew-point temperature.

More specifically, when the outlet temperature is higher than the dew-point temperature, the electric pump is operated to circulate engine coolant, whereby the temperature of the intake gases is lowered. On the other hand, when the outlet temperature is not higher than the dew-point temperature, the electric pump is stopped and in addition, engine coolant for cooling an engine body, which is relatively high in temperature, is caused to flow into the intercooler, whereby the temperature in the intercooler is raised. Through this operation, the outlet temperature is made higher than the dew-point temperature, to thereby prevent condensed water from being generated when intake gases is cooled by the intercooler.

As described hereinabove, in the above cooling control system, the outlet temperature is adjusted by controlling the operation of the electric pump according to the above-described outlet temperature and dew-point temperature. However, since the outlet temperature is adjusted with reference to the dew-point temperature, there is a fear that the electric pump is operated more than necessary although the outlet temperature is lowered close to the dew-point temperature, whereby a large amount of electric power is consumed to exert an adverse influence on fuel economy. Further, when intake gases having a relatively high temperature is introduced into the intake passage in a stopped state of the electric pump, the intake gases cannot be properly cooled, which sometimes causes reduction of the power output of the engine.

SUMMARY OF THE INVENTION

It is an object of the present invention to provide a cooling control system for an internal combustion engine, which is capable of circulating engine coolant while suppressing power consumption by an engine coolant pump as much as possible, whereby it is possible to cool intake gases and suppress generation of condensed water in a compatible manner, and prevent fuel economy from being adversely affected by driving the engine coolant pump.

To attain the above object, the present invention provides a cooling control system for an internal combustion engine that includes a supercharger, the cooling control system being provided for cooling intake gases which have been increased in temperature by being pressurized by the supercharger, comprising an intercooler provided in an intake passage of the engine at a location downstream of a compressor of the supercharger, for cooling the intake gases by heat exchange with engine coolant, a heat exchanger for dissipating heat from the engine coolant, an engine coolant passage connecting between the intercooler and the heat exchanger, for circulating the engine coolant between the intercooler and the heat exchanger, an engine coolant pump of the electrically-driven type, which is provided in the engine coolant passage, for delivering the engine coolant to thereby cause the engine coolant to circulate, pump control means for controlling an amount of the engine coolant to be delivered by the engine coolant pump, engine coolant temperature detection means for detecting a temperature of the engine coolant flowing into the intercooler, operating condition detection means for detecting an operating condition of the engine, and target temperature-setting means for setting a target temperature of the engine coolant within the intercooler, according to the detected operating condition, wherein when a difference between the detected temperature of the engine coolant and the set target temperature is not larger than a predetermined value, the pump control means controls the amount of the engine coolant to be delivered to a predetermined minimum flow rate larger than 0, whereas when the difference is larger than the predetermined value, the pump control means controls the amount of the engine coolant to be delivered such that the amount of the engine coolant to be delivered becomes larger as the difference is larger.

With the configuration of this cooling control system for an internal combustion engine, a circuit within which the engine coolant circulates is formed by the intercooler, the heat exchanger, the engine coolant passage connecting between the intercooler and the heat exchanger, and the engine coolant pump, and intake gases which have been increased in temperature by being pressurized by the supercharger are cooled when the intake gases pass through the intercooler in the intake passage. Further, the temperature of the engine coolant flowing into the intercooler is detected, and a target temperature of the engine coolant within the intercooler, more specifically, a temperature of the engine coolant for preventing condensed water from being generated in the intake gases passing through the intercooler is set according to the operating condition of the engine. When the difference between the detected engine coolant temperature and the target temperature is not larger than the predetermined value, the amount of the engine coolant to be delivered by the engine coolant pump is controlled to the predetermined minimum flow rate larger than 0. Note that the minimum flow rate is intended to mean the lowest amount of engine coolant to be delivered by the engine coolant pump, to which the engine coolant pump can be controlled, and is determined by a property of the pump itself.

In general, although intake gas cooling performance by the intercooler of the water cooled type is low in sensitivity to a flow rate of the engine coolant, it is largely influenced by the temperature of the engine coolant. Therefore, even when the amount of the engine coolant delivered by the engine coolant pump is reduced, by appropriately controlling the temperature of the engine coolant, it is possible to properly cool the intake gases. Further, if the engine coolant pump is stopped to reduce the amount of the delivered engine coolant to 0, the circulation of the engine coolant is stopped. As a consequence, the temperature of the engine coolant cannot be properly detected, and if the temperature thus detected is used, cooling control cannot be properly performed. In addition, for example, when load on the engine is steeply increased to steeply raise the temperature of the intake gases, if the circulation of the engine coolant remains stopped, it is impossible to cope with the steep temperature change of the intake gases, which can hinder proper cooling of the intake gases. Therefore, when the above-described difference is not larger than the predetermined value, the engine coolant pump is controlled such that the engine coolant is delivered at the minimum flow rate, whereby it is possible to properly cool the intake gases, which makes it possible to circulate the engine coolant while suppressing power consumption by the engine coolant pump as much as possible. Further, when the above-described difference is larger than the predetermined value, the amount of the delivered engine coolant is controlled such that it becomes larger as the difference is larger. As a consequence, even when the difference is large, the temperature of the engine coolant is quickly controlled such that it becomes equal to the target temperature, whereby it is possible to properly cool the intake gases. With the above, according to the present invention, it is possible to cool the intake gases and suppress generation of condensed water in a compatible manner, and prevent fuel economy from being adversely affected by driving the engine coolant pump.

Preferably, the engine further includes an EGR device for recirculating part of exhaust gases discharged into an exhaust passage of the engine to an upstream side of the compressor in the intake passage as EGR gases, and the cooling control system further comprises operating region determination means for determining, based on the detected operating condition of the engine, whether or not the engine is in a predetermined operating region where recirculation of the EGR gases by the EGR device is not to be performed but supercharging by the supercharger is to be performed, wherein when it is determined that the engine is in the predetermined operating region, the pump control means controls the amount of the engine coolant to be delivered to a predetermined maximum flow rate, irrespective of the difference.

With the configuration of the preferred embodiment, the operating region determination means determines based on the operating condition whether or not the engine is in the predetermined operating region where the recirculation of the EGR gases by the EGR device is not to be performed but supercharging by the supercharger is to be performed. When it is determined that the engine is in the predetermined operating region, the amount of the engine coolant to be delivered by the engine coolant pump is controlled to the predetermined maximum flow rate, irrespective of the above-mentioned difference. Note that the maximum flow rate is a necessary flow rate for ensuring sufficient cooling of the intake gases during the maximum power output of the engine.

When the engine is in the predetermined operating region, the EGR gases are not recirculated to the intake passage, and hence moisture included in the intake gases is only moisture included in intake air. Accordingly, the amount of moisture is very small, compared with a case where EGR gases are included in the intake gases. Therefore, even when the intake gases which have been increased in temperature by being pressurized by the supercharger are cooled to the greatest extent, this hardly brings about the problem of generation of condensed water.

From the above viewpoint, when the engine is in the above-described predetermined operating region, the amount of the engine coolant to be delivered by the engine coolant pump is controlled to the predetermined maximum flow rate, and the intake gases which have been increased in temperature by being pressurized by the supercharger are cooled to the greatest extent, whereby it is possible to largely enhance the charging efficiency of the intake gases, thereby making it possible to ensure the maximum power output of the engine and improve fuel economy.

The above and other objects, features, and advantages of the present invention will become more apparent from the following detailed description taken in conjunction with the accompanying drawings.

DETAILED DESCRIPTION OF PREFERRED EMBODIMENTS

Figure 1:
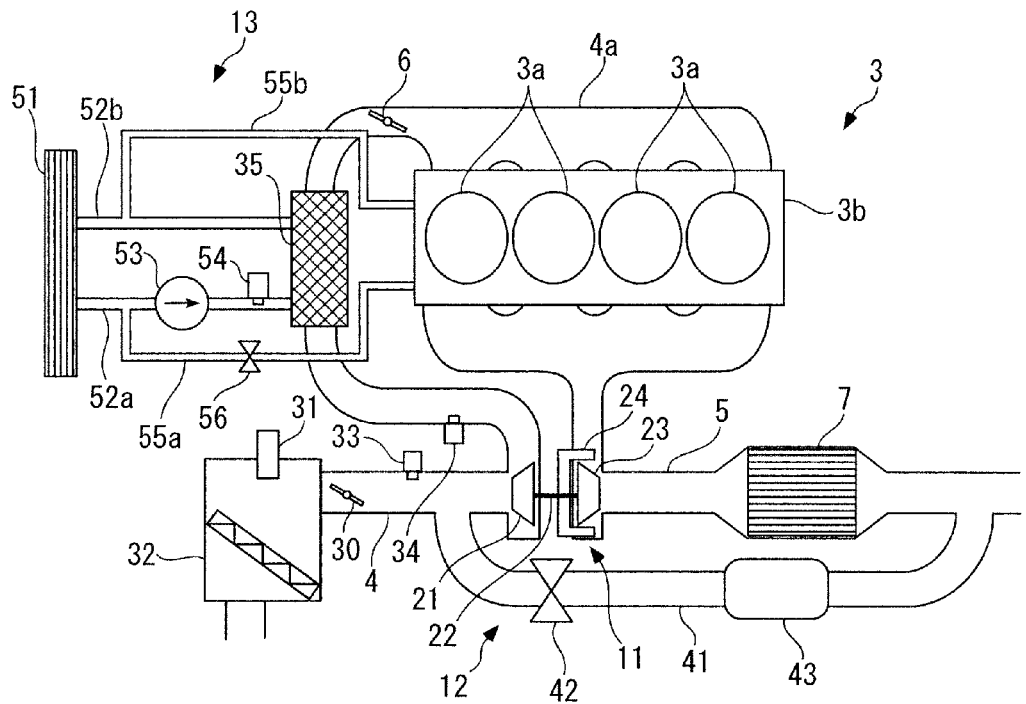
FIG. 1 is a schematic diagram of an internal combustion engine to which is applied a cooling control system according to an embodiment of the present invention.
Figure 2:
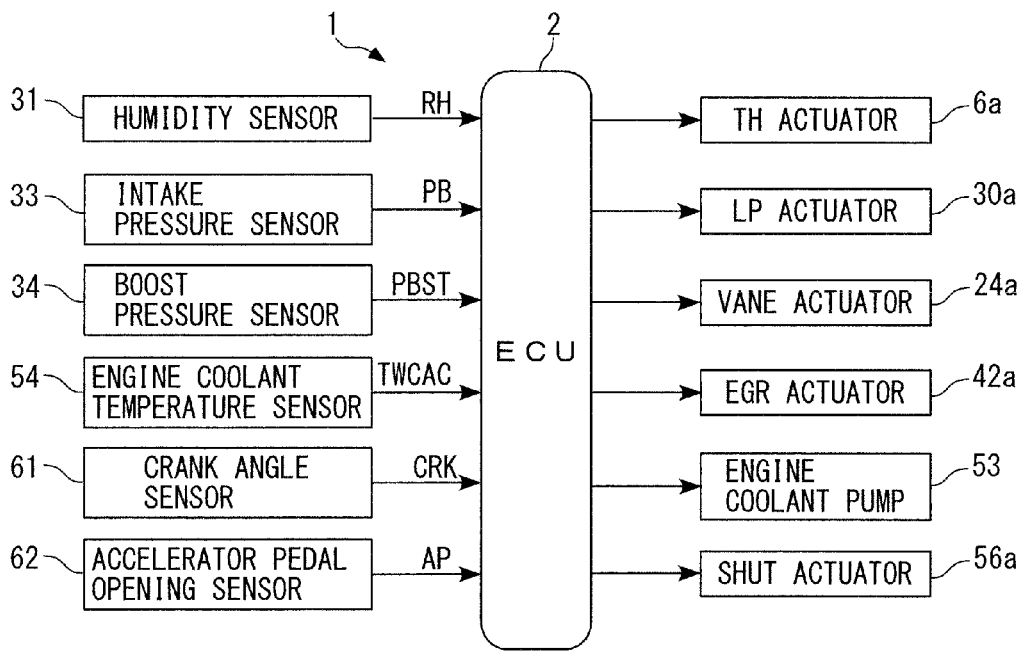
FIG. 2 is a schematic block diagram of the cooling control system.

The present invention will now be described in detail with reference to the drawings showing preferred embodiments thereof. FIG. 1 schematically shows an internal combustion engine 3 (hereinafter referred as "the engine 3") to which is applied a cooling control system 1 according to an embodiment of the present invention. FIG. 2 schematically shows the cooling control system 1. As shown in FIG. 1, the engine 3 is a gasoline engine that has four cylinders 3a, and is installed on a vehicle (not shown) as a motive power source. Further, the engine 3 is provided with a turbocharger 11 (supercharger), an EGR device 12, a cooling device 13, and so forth.

The turbocharger 11 is comprised of a compressor 21 disposed in an intake passage 4, a turbine 23 disposed in an exhaust passage 5 for rotating in unison with the compressor 21 via a shaft 22, a plurality of variable vanes 24, and a vane actuator 24a for actuating the variable vanes 24. In the turbocharger 11, when the turbine 23 is driven for rotation by exhaust gases flowing though the exhaust passage 5, the compressor 21 integrally formed therewith rotates at the same time, whereby a supercharging operation is performed in which intake gases are delivered toward an engine body 3b while pressurizing the gases.

The variable vanes 24 are pivotally mounted on a wall portion of a housing (not shown) that houses the turbine 23, and are mechanically connected to the vane actuator 24a. An opening of each variable vane 24 is controlled by an ECU 2, described hereinafter, via the vane actuator 24a. With this control, the amount of exhaust gases blown to the turbine 23 is changed, and accordingly the rotational speeds of the turbine 23 and the compressor 21 are changed, whereby a boost pressure is controlled.

In the intake passage 4, there are provided an air cleaner 32 having a humidity sensor 31 attached thereto, an LP intake throttle valve 30, an intake pressure sensor 33, the above-mentioned compressor 21, a boost pressure sensor 34, an intercooler 35 of the cooling device 13, and a throttle valve 6 are provided, from upstream in the mentioned order. The humidity sensor 31 detects a humidity RH of outside air taken into the air cleaner 32 as a relative humidity, and delivers a signal indicative of the detected humidity RH to the ECU 2. The intake pressure sensor 33 detects pressure within the intake passage 4 on the upstream side of the compressor 21 as an intake pressure PB, and delivers a signal indicative of the detected intake pressure PB to the ECU 2. Further, the intake pressure sensor 33 also detects a weak negative pressure, as the intake pressure PB, which is generated, in order to stably introduce EGR gases by the EGR device 12, by controlling the LP intake throttle valve 30 pivotally disposed in the intake passage 4 at a location downstream of the air cleaner 32, by an LP actuator 30a according to a control input from the ECU 2, and delivers a signal indicative of the detected intake pressure PB to the ECU 2. The boost pressure sensor 34 detects pressure within the intake passage 4 at a location immediately downstream of the compressor 21 as a boost pressure PBST, and delivers a signal indicative of the detected boost pressure PEST to the ECU 2.

The intercooler 35 cools the intake gases pressurized by the compressor 21 of the turbocharger 11 by heat exchange with engine coolant. Note that the cooling device 13 including the intercooler 35 will be described hereinafter.

The throttle valve 6 is pivotally disposed in the intake passage 4 at a location upstream of an intake manifold 4a. The degree of opening of the throttle valve 6 is controlled by a TH actuator 6a according to a control input from the ECU 2, whereby the amount of intake gases passing through the throttle valve 6 is controlled.

A catalyst 7 is provided in the exhaust passage 5 at a location downstream of the turbine 23. The catalyst 7 is implemented e.g. by a three-way catalyst, and purifies exhaust gases by oxidizing HC and CO and reducing NOx in the exhaust gases flowing through the exhaust passage 5.

The EGR device 12 performs an EGR operation for recirculating part of exhaust gases discharged into the exhaust passage 5 to the intake passage 4, as EGR gases, and is comprised of an EGR passage 41, an EGR valve 42 and an EGR cooler 43. The EGR passage 41 is connected to a portion of the intake passage 4 at a location upstream of the compressor 21, and a portion of the exhaust passage 5 at a location downstream of the catalyst 7.

The EGR valve 42 is of the butterfly type, and is connected to an EGR actuator 42a formed e.g. by a DC motor. A pivot angle of the EGR valve 42 is controlled by controlling electric current supplied to the EGR actuator 42a by the ECU 2, whereby the amount of EGR gases recirculated from the exhaust passage 5 into the intake passage 4 is controlled.

The EGR cooler 43 is disposed in the EGR passage 41 at a location upstream of the EGR valve 42 (on a side toward the exhaust passage 5), and cools high-temperature EGR gases flowing thorough the EGR passage 41 using engine coolant for cooling the engine body 3b.

The cooling device 13 cools intake gases which have been increased in temperature by being pressurized by the supercharging operation of the turbocharger 11. The cooling device 13 includes the above-mentioned intercooler 35, a sub radiator 51 (heat exchanger), a first engine coolant passage 52a and a second engine coolant passage 52b which connect the two 35 and 51 to each other for circulating engine coolant therebetween, an engine coolant pump 53 of the electrically-driven type, which is provided in the first engine coolant passage 52a for delivering engine coolant, and so forth. The sub radiator 51 lowers the temperature of engine coolant by dissipating heat therefrom.

The engine coolant pump 53 is driven by being energized by a battery (not shown) installed on the vehicle such that the engine coolant pump 53 discharges engine coolant, and thereby sends the engine coolant from the sub radiator 51 to the intercooler 35. Therefore, in the cooling device 13, the engine coolant is circulated in the counterclockwise direction, as viewed in FIG. 1. Further, a pump flow rate QEWP which is an amount of engine coolant delivered by the engine coolant pump 53 is controlled by a control signal from the ECU 2.

An engine coolant temperature sensor 54 (engine coolant temperature detection means) is inserted into a portion of the first engine coolant passage 52a at a location between the intercooler 35 and the engine coolant pump 53. The engine coolant temperature sensor 54 detects an engine coolant temperature TWCAC which is the temperature of engine coolant flowing into the intercooler 35, and delivers a signal indicative of the detected engine coolant temperature TWCAC to the ECU 2.

Further, the cooling device 13 is provided with a first connection passage 55a and a second connection passage 55b which are capable of causing engine coolant to flow therethrough, as connection passages for connecting the above-mentioned first and second engine coolant passages 52a and 52b and a cooling circuit (not shown) of the engine body 3b to each other. More specifically, the first connection passage 55a is connected to a portion of the first engine coolant passage 52a between the sub radiator 51 and the engine coolant pump 53, whereas the second connection passage 55b is connected to the second engine coolant passage 52b.

The above-mentioned first connection passage 55a is provided with a shut valve 56. The shut valve 56 is controlled by a control signal from the ECU 2 via a shut actuator 56a, and opens and closes the first connection passage 55a. More specifically, when the first connection passage 55a is opened, the cooling device 13 and the cooling circuit of the engine body 3b is connected to each other, whereby engine coolant within the engine body 3b is allowed to flow into the cooling device 13. The temperature of the engine coolant within the engine body 3b is higher than that of the engine coolant in the cooling device 13, and hence when the engine coolant within the engine body 3b flows into the cooling device 13, the temperature of the engine coolant in the cooling device 13 becomes higher.

On the other hand, when the first connection passage 55a is closed by the shut valve 56, the engine coolant within the engine body 3b is inhibited from flowing into the cooling device 13, so that in the cooling device 13, a closed circuit is formed by the intercooler 35, the sub radiator 51, and the first and second engine coolant passages 52a and 52b, and engine coolant circulates in the closed circuit.

Further, the engine 3 is provided with a crank angle sensor 61. The crank angle sensor 61 delivers a CRK signal, which is a pulse signal, to the ECU 2 along with rotation of a crankshaft (not shown), whenever the crankshaft rotates through a predetermined crank angle (e.g. 30). The ECU 2 calculates a rotational speed NE of the engine 3 (hereinafter referred to as "the engine speed NE") based on the CRK signal. Further, output to the ECU 2 is a detection signal indicative of a stepped-on amount (hereinafter referred to as "accelerator pedal opening") AP of an accelerator pedal (not shown) from an accelerator pedal opening sensor 62.

The ECU 2 is implemented by a microcomputer comprised of a CPU, a RAM, a ROM, and an I/O interface (none of which are specifically shown). The ECU 2 determines operating conditions of the engine 3 according to the detection signals from the aforementioned sensors, and the like, and performs a flow rate control process for the engine coolant pump 53 according to the determined operating conditions. Note that in the present embodiment, the ECU 2 corresponds to pump control means and operating region determination means.

Figure 3:
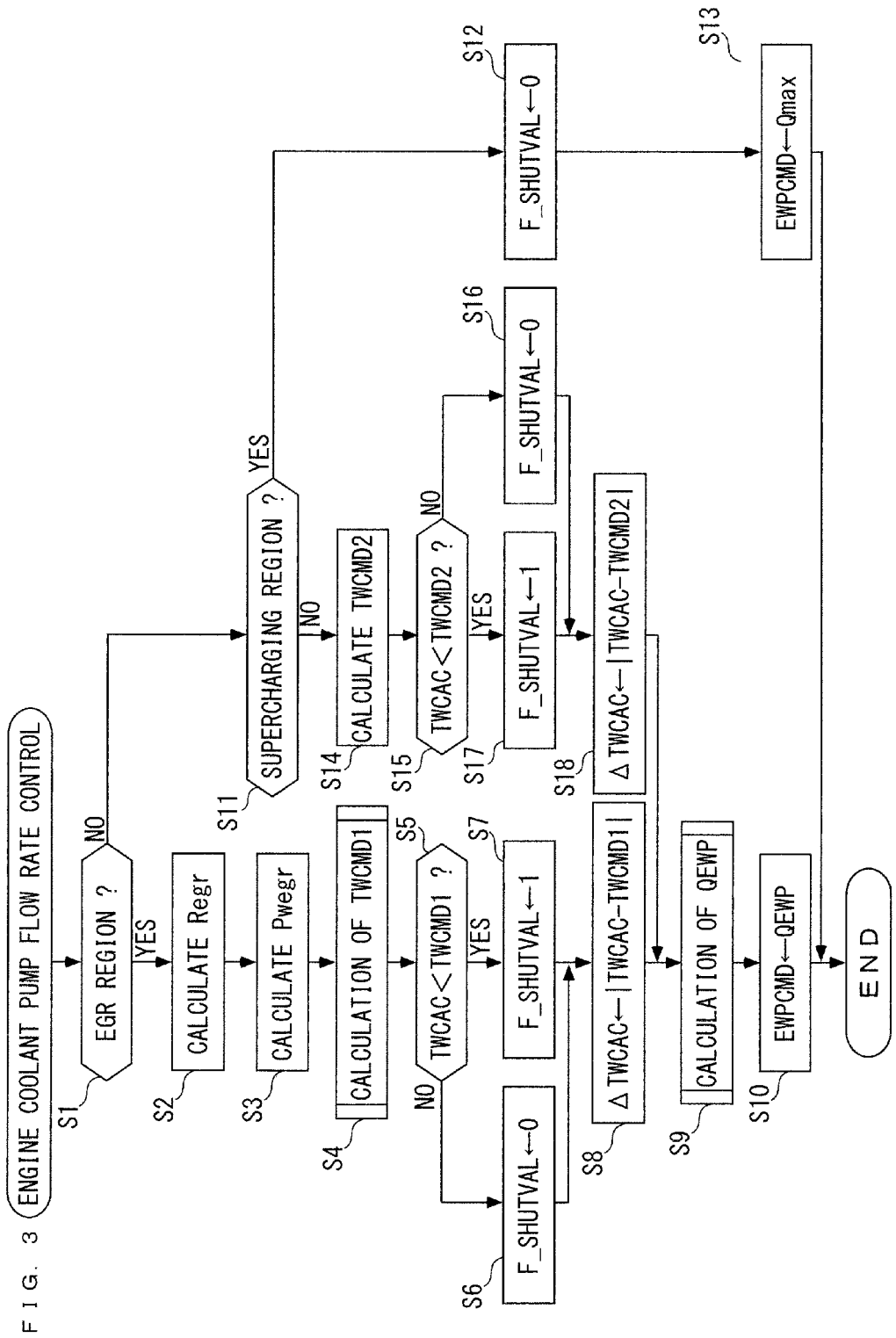
FIG. 3 is a flowchart of a main routine of a flow rate control process for an engine coolant pump.

FIG. 3 shows the flow rate control process for the engine coolant pump 53, which is performed by the ECU 2. This process is executed at a predetermined repetition period.

In the present process, first, in a step 1 (shown as S1 in abbreviated form in FIG. 3; the following steps are also shown in abbreviated form), it is determined whether or not the engine 3 is in an EGR region, which is an operating region where the EGR should be performed.

Figure 6:
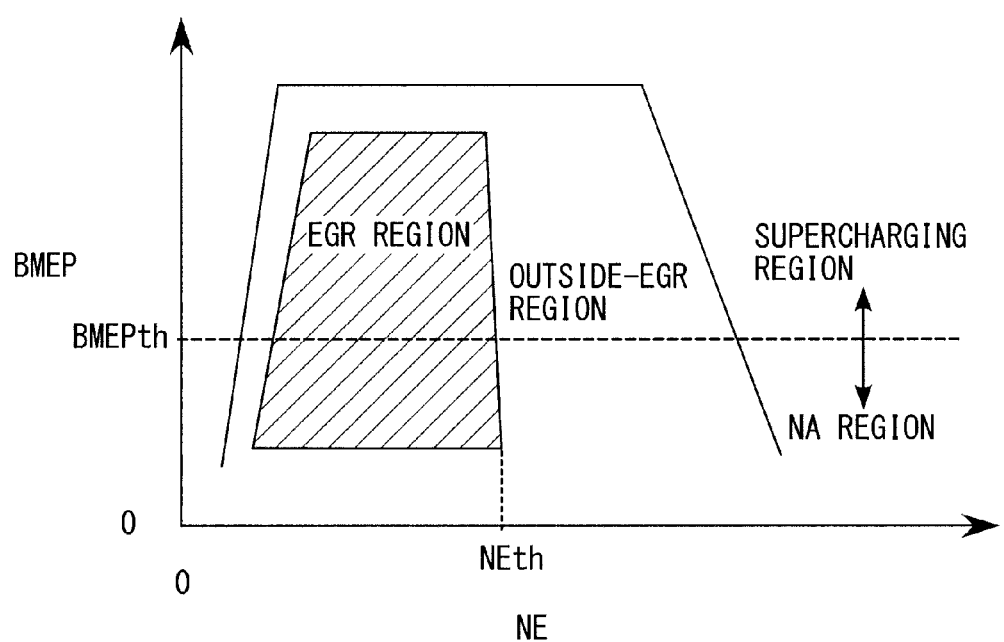
FIG. 6 is a view of a map for use in determining operating regions (an EGR region, an outside-EGR region, a supercharging region, and an NA region) of the engine according to operating conditions of the engine.

FIG. 6 shows a map for use in determining operating regions of the engine 3, i.e. the above-mentioned EGR region, an outside-EGR region where the EGR should not be executed, a supercharging region where the supercharging operation should be performed, and an NA region where natural air intake should be performed, according to operating conditions of the engine 3. In this map, the operating regions of the engine 3 are set according to the engine speed NE and a net average effective pressure BMEP indicative of load on the engine 3. More specifically, when the engine speed NE is not larger than a predetermined value NEth, i.e. NE is relatively low, the operating region of the engine 3 is set to the EGR region, whereas when the engine speed NE is larger than the predetermined value NEth, i.e. NE is relatively high, the operating region of the engine 3 is set to the outside-EGR region. Further, when the net average effective pressure BMEP is not smaller than a predetermined value BMEPth, i.e. the load on the engine 3 is relatively large, the operating region of the engine 3 is set to the supercharging region, whereas when the net average effective pressure BMEP is smaller than the predetermined value BMEPth, i.e. the load on the engine 3 is relatively small, the operating region of the engine 3 is set to the NA region.

If the answer to the question of the above-described step 1 is affirmative (YES), i.e. if the engine 3 is in the EGR region, the EGR is executed, and an EGR ratio Regr, which is a ratio of the amount of EGR gases to the amount of intake gases including the EGR gases is calculated (step 2). The EGR ratio Regr is calculated by searching a map (not shown) according to the engine speed NE and the accelerator pedal opening AP.

Then, a water vapor partial pressure Pwegr in the EGR gases is calculated (step 3). The water vapor partial pressure Pwegr is calculated using pressure on the upstream side of the compressor 21 of the turbocharger 11 (the intake pressure PB in the present embodiment), the EGR ratio Regr calculated in the above-described step 2, and a ratio of the amount of water vapor to the amount of exhaust gases including the vapor (0.14 in the present embodiment), by the following equation (1):

$$Pwegr = PB \times Regr \times 0.14 \qquad (1)$$

In the following step 4, a first target engine coolant temperature TWCMD1 is calculated which is a target temperature of the engine coolant temperature TWCAC, for preventing condensed water from being generated in intake gases passing through the intercooler 35 in the intake passage 4. Here, a method of calculating the first target engine coolant temperature TWCMD1 will be described in detail.

Figure 7:
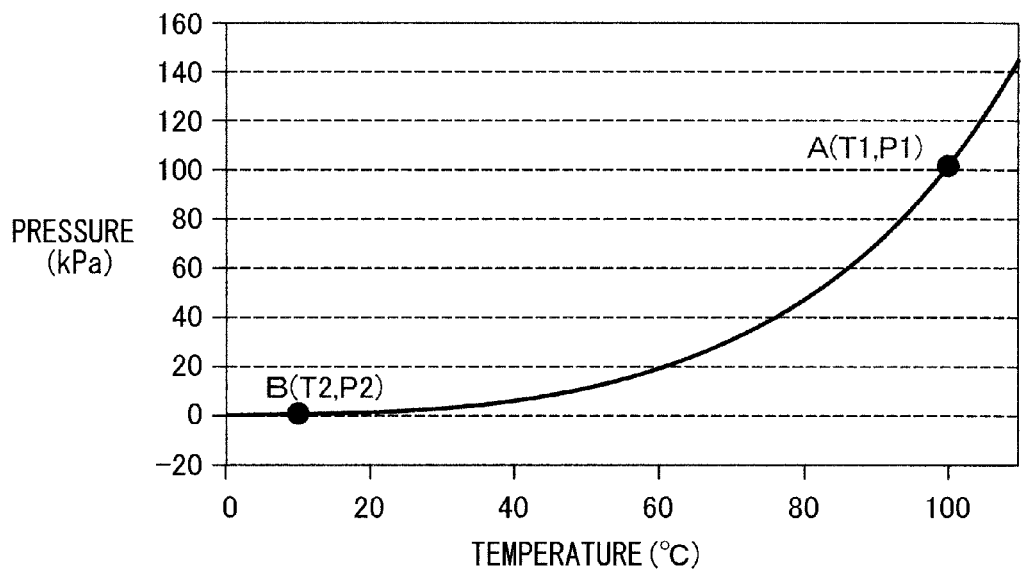
FIG. 7 is a view of a vapor pressure curve of water.

FIG. 7 shows a vapor pressure curve of water. In the vapor pressure curve, for example, assuming that a temperature and a pressure at a point A are represented by T1 and P1, respectively, and a temperature and a pressure at a point B are represented by T2 and P2, respectively, the vapor pressure curve can be approximated using the temperatures and pressures of the above two points, by the following equation (2) based on the Clausius-Clapeyron equation:

$$\ln \frac{P2}{P1} = \frac{L}{R}\left(\frac{1}{T1} - \frac{1}{T2}\right) \qquad (2)$$

L: MOLAR HEAT OF VAPORIZATION OF SUBSTANCE
R: GAS CONSTANT

From the equation (2), the relationship between a given pressure P and a given temperature T on the vapor pressure curve can be expressed and the following equation (3):

$$P = \exp\left\{\frac{L}{R}\left(\frac{1}{T1} - \frac{1}{T}\right) + \ln P1\right\} \qquad (3)$$

-continued $$= \exp\left(\frac{L}{R} \cdot \frac{-1}{T} + \frac{L}{R} \cdot \frac{1}{T1} + \ln P1\right)$$

Out of the three addition terms in the parentheses of the equation (3), the two addition terms on the right side are constants, and hence assuming that the two addition terms is represented by a constant C, the equation (3) is rewritten into the following equation (4):

$$P = \exp\left(\frac{L}{R} \cdot \frac{-1}{T} + C\right) \quad (4)$$

When liquid of vapor represented by the above equation (4) is water, if the temperatures and pressures of two points on the vapor pressure curve are known, L/R and C in the equation (4) can be calculated. For example, by substituting the temperatures and pressures of the above-mentioned point A (100° C., 101.3 kPa) and point B (10° C., 1.33 kPa) into the equation (4), L/R and C are determined as the following values:

L/R=5087.06

C=18.25

When these values are substituted into the equation (4), there is obtained the following equation (5) representing the relationship between the pressure P of water vapor pressure and the temperature T:

$$P = \exp\left(\frac{-5087.06}{T} + 18.25\right) \quad (5)$$

In the above equation (5), an inverse function of the temperature T is expressed by the following equation (6):

$$T = \frac{-5087.06}{\ln P - 18.25} \quad (6)$$

Figure 8:
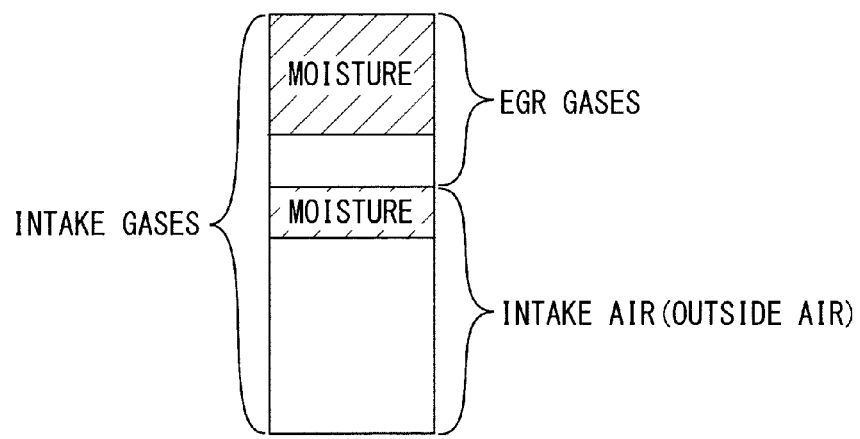
FIG. 8 is a view useful in expressing a ratio between the amount of moisture in intake air and the amount of moisture in EGR gases, in intake gases.

FIG. 8 schematically shows intake air (outside air) and EGR gases of intake gases during execution of the EGR. As shown in FIG. 8, moisture included in the intake air, and moisture included in the EGR gases exist in the intake gases, and the sum of these moisture amounts is the amount of moisture in the gases drawn into the engine 3.

A water vapor partial pressure Pwamb of the intake air of the above-described intake gases is calculated using a saturated vapor pressure PV calculated by the above-mentioned equation (5), and the humidity RH, by the following equation (7):

$$Pwamb = PV \times RH \times (1 - Regr) \quad (7)$$

Further, the water vapor partial pressure Pwegr of the EGR gases is calculated by the aforementioned equation (1). In addition, since the turbocharger 11 is provided in the engine 3, when the engine 3 is in the supercharging region, the intake gases are pressurized by the compressor 21. Therefore, a water vapor partial pressure Pwtotal of the intake gases is calculated by the following equation (8) in which the vapor partial pressures of the intake air and the EGR gases are multiplied by the boost pressure PBST:

$$Pwtotal = PBST \times (Pwamb + Pwegr) \quad (8)$$
$$= PBST \times \{PV \times RH \times (1 - Regr) + PB \times Regr \times 0.14\}$$

From the equation (6), using the water vapor partial pressure Pwtotal of the intake gases thus calculated, the first target engine coolant temperature TWCMD1 is expressed by the following equation (9):

$$TWCMD1 = \frac{-5087.06}{\ln Pwtotal - 18.25} - 273.15 \quad (9)$$

Figure 4:
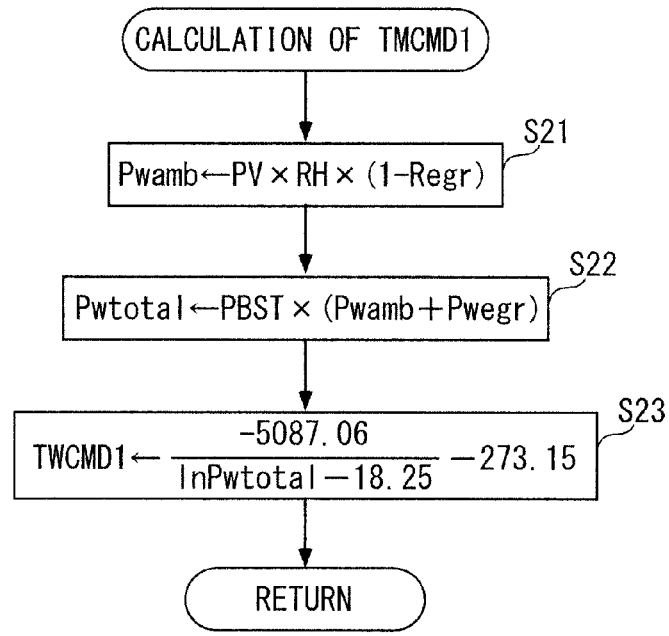
FIG. 4 is a flowchart of a sub routine of a process for calculating a first target engine coolant temperature.

FIG. 4 shows a sub routine of a process for calculating the above-mentioned first target engine coolant temperature TWCMD1. In the present process, first, the water vapor partial pressure Pwamb of the intake air of the intake gases is calculated by the aforementioned equation (7), using the saturated vapor pressure PV, the humidity RH, and the EGR ratio Regr calculated in the step 2 (step 21).

Then, the water vapor partial pressure Pwtotal of the intake gases is calculated by the aforementioned equation (8), using the boost pressure PBST, the water vapor partial pressure Pwamb of the intake air calculated in the step 21, and the water vapor partial pressure Pwegr of the EGR gases calculated in the step 3 (step 22).

Next, the first target engine coolant temperature TWCMD1 is calculated by the aforementioned equation (9), using the water vapor partial pressure Pwtotal of the intake gases calculated in the above-described step 22 (step 23), followed by terminating the present process.

Referring again to FIG. 3, in a step 5 following the step 4, it is determined whether or not the engine coolant temperature TWCAC is lower than the first target engine coolant temperature TWCMD1 calculated in the step 4. If the answer to this question is negative (NO), a shut valve open flag F_SHUTVAL is set to 0 (step 6). In this case, the shut valve 56 is closed, or if the shut valve 56 has already been closed, a closed state of the shut valve 56 is maintained. This causes engine coolant in the cooling device 13 to circulate in the closed circuit of the cooling device 13.

On the other hand, if the answer to the question of the above-described step 5 is affirmative (YES), the shut valve open flag F_SHUTVAL is set to 1 (step 7). In this case, the shut valve 56 is opened, or if the shut valve 56 has already been opened, an opened state of the shut valve 56 is maintained. This causes the engine coolant in the engine body 3b, which is relatively high in temperature, to flow into the cooling device 13, resulting in an increase in the temperature of the engine coolant in the cooling device 13.

Figure 9:
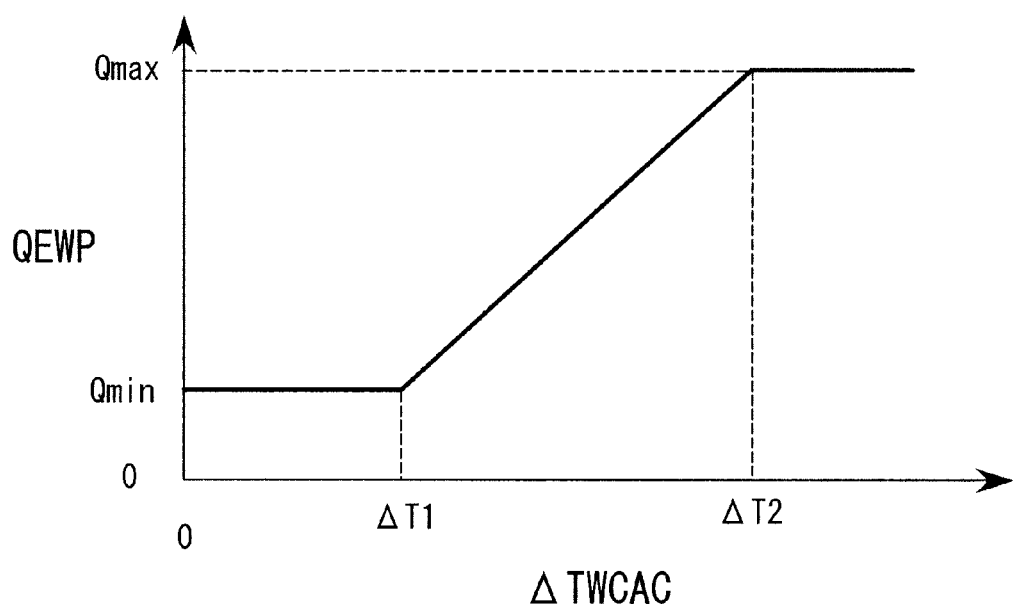
FIG. 9 is a view of a table in which the relationship between an engine coolant temperature difference and a pump flow rate is set.

Then, an absolute value of the difference between the engine coolant temperature TWCAC and the first target engine coolant temperature TWCMD1 calculated in the step 4 is calculated as an engine coolant temperature difference Δ TWCAC (step 8), and the pump flow rate QEWP of the engine coolant pump 53 is calculated by searching a QEWP table shown in FIG. 9 according to the engine coolant temperature difference Δ TWCAC (step 9).

As shown in FIG. 9, in the QEWP table, when the engine coolant temperature difference Δ TWCAC is not larger than a first predetermined value Δ T1, the pump flow rate QEWP is set to a predetermined minimum flow rate Qmin larger than 0. The minimum flow rate Qmin is a lowest flow rate to which the engine coolant pump 53 can be controlled, and is determined by characteristics of the pump itself. Further, in the QEWP table, when the engine coolant temperature difference Δ TWCAC is larger than the first predetermined value Δ T1 and is smaller than a second predetermined value Δ T2, the pump flow rate QEWP is set such that it becomes larger as the engine coolant temperature difference Δ TWCAC is larger. Furthermore, in the QEWP table, when the engine coolant temperature difference Δ TWCAC is not smaller than the second predetermined value Δ T2, the pump flow rate QEWP is set to a predetermined maximum flow rate Qmax. The maximum flow rate Qmax is a necessary flow rate for ensuring sufficient cooling of intake gases during the maximum output of the engine 3.

Figure 5:
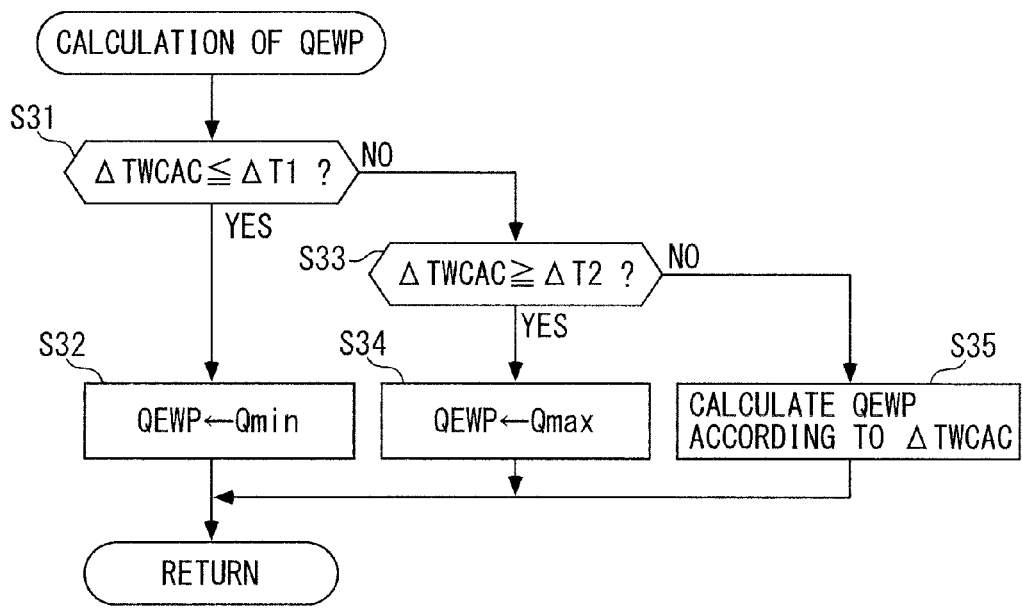
FIG. 5 is a flowchart of a sub routine of a process for calculating a pump flow rate of the engine coolant pump.

FIG. 5 shows a sub routine of a process for calculating the pump flow rate QEWP. In the present process, first, it is determined whether or not the engine coolant temperature difference Δ TWCAC calculated in the above-described step 8 is not larger than the first predetermined value Δ T1 (step 31). If the answer to this question is affirmative (YES), the pump flow rate QEWP is set to the minimum flow rate Qmin (step 32), followed by terminating the present process. Further, if the answer to the question of the above-described step 31 is negative (NO), the process proceeds to a step 33, wherein it is determined whether or not the engine coolant temperature difference Δ TWCAC is not smaller than the second predetermined value Δ T2. If the answer to this question is affirmative (YES), the pump flow rate QEWP is set to the maximum flow rate Qmax (step 34), followed by terminating the present process.

On the other hand, if the answer to the question of the above-described step 33 is negative (NO), i.e. if Δ T1<Δ TWCAC<Δ T2 holds, the pump flow rate QEWP is calculated by searching the QEWP table shown in FIG. 9 according to the engine coolant temperature difference ΔTWCAC (step 35), followed by terminating the present process. In the step 35, as described hereinabove, the pump flow rate QEWP is calculated such that it becomes larger as the engine coolant temperature difference Δ TWCAC is larger.

Referring again to FIG. 3, in a step 10 following the step 9, the pump flow rate QEWP calculated in the step 9 is set as a command value EWPCMD of the amount of engine coolant to be delivered by the engine coolant pump 53 (step 10), followed by terminating the present process. With this, during execution of the EGR, when intake gases pass through the intercooler 35 in the intake passage 4, it is possible to ensure suppression of generation of condensed water with a minimum operation of the engine coolant pump 53, whereby it is possible to minimize the adverse influence of driving the engine coolant pump 53 on fuel economy.

If the answer to the question of the above-described step 1 is negative (NO), i.e. if the engine 3 is in the outside-FGR region, the process proceeds to a step 11, wherein it is determined whether or not the engine 3 is in the supercharging region. If the answer to this question is affirmative (YES), i.e. if the engine 3 is in the outside-EGR region and at the same time in the supercharging region, the shut valve open flag F_SHUTVAL is set to 0 (step 12), and the command value EWPCMD to the engine coolant pump 53 is set to the maximum flow rate Qmax (step 13), followed by terminating the present process.

In this case, EGR gases are not introduced into the engine 3, and the amount of moisture in intake gases (intake air) is relatively small, so that even if the intake gases are cooled, the possibility of generation of condensed water is very low. Therefore, engine coolant is circulated within the closed circuit of the cooling device 13 in the closed state of the shut valve 56, by setting the amount of the engine coolant to be delivered by the engine coolant pump 53 to the maximum flow rate Qmax. As a consequence, intake gases (intake air) pressurized by the turbocharger 11 are cooled to the greatest extent, whereby it is possible to ensure enhancement of the power output of the engine 3.

Figure 10:
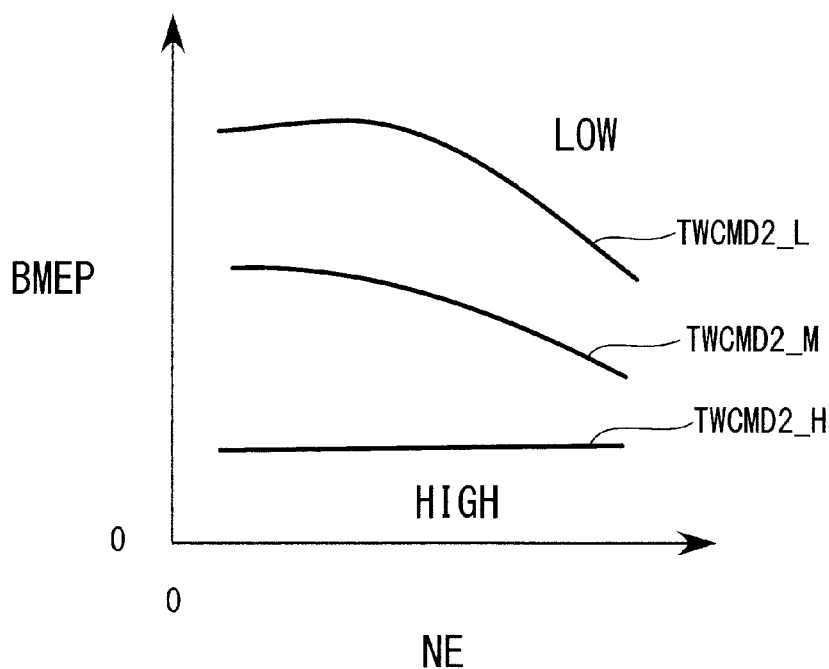
FIG. 10 is a view of a map for use in calculating a second target engine coolant temperature.

On the other hand, if the answer to the question of the above-described step 11 is negative (NO), i.e. if the engine 3 is in the outside-EGR region and at the same time in the NA region, the process proceeds to a step 14, wherein a second target engine coolant temperature TWCMD2 which is a target temperature of the engine coolant temperature TWCAC is calculated. More specifically, the second target engine coolant temperature TWCMD2 is calculated by searching a TWCMD2 map shown in FIG. 10 according to the engine speed NE and the net average effective pressure BMEP indicative of the load on the engine 3.

In the TWCMD2 map, three predetermined temperatures TWCMD2_L, TWCMD2_M and TWCMD2_H are set as the second target engine coolant temperature TWCMD2. The magnitude relationship between the above three temperatures is TWCMD2_L<TWCMD2_M<TWCMD2_H, and the second target engine coolant temperature TWCMD2 is set such that it becomes lower as the load on the engine 3 is larger. Further, when the value of the second target engine coolant temperature TWCMD2 determined based on the engine speed NE and the net average effective pressure BMEP is not equal to any of the above-mentioned three temperatures, the second target engine coolant temperature TWCMD2 is calculated by interpolation.

In a step 15 following the above-described step 14, it is determined whether or not the engine coolant temperature TWCAC is lower than the second target engine coolant temperature TWCMD2. If the answer to this question is negative (NO), the shut valve open flag F_SHUTVAL is set to 0 (step 16). In this case, similar to the above-described step 6, the shut valve 56 is closed or is held in the closed state. This causes the engine coolant in the cooling device 13 to circulate within the closed circuit of the cooling device 13.

On the other hand, if the answer to the question of the step 15 is affirmative (YES), the shut valve open flag F_SHUTVAL is set to 1 (step 17). In this case, similar to the above-described step 7, the shut valve 56 is opened or is held in the opened state. This causes the engine coolant in the engine body 3b, which is relatively high in temperature, to flow into the cooling device 13, resulting in an increase in the temperature of the engine coolant in the cooling device 13.

Then, an absolute value of the difference between the engine coolant temperature TWCAC and the second target engine coolant temperature TWCMD2 calculated in the step 14 is calculated as the engine coolant temperature difference Δ TWCAC (step 18), and the above-described steps 9 and 10 are executed. More specifically, the pump flow rate QEWP of the engine coolant pump 53 is calculated by searching the QEWP table shown in FIG. 9 according to the engine coolant temperature difference Δ TWCAC calculated in the step 18 (step 9), and the pump flow rate QEWP is set as the command value EWPCMD of the amount of engine coolant to be delivered by the engine coolant pump 53 (step 10), followed by terminating the present process.

As described in detail heretofore, according to the present embodiment, the circuit within which engine coolant circulates is formed by the intercooler 35, the sub radiator 51, the first and second engine coolant passages 52a and 52b, and the engine coolant pump 53, and intake gases which have been increased in temperature by being pressurized by the turbocharger 11 are cooled when the intake gases pass through the intercooler 35 in the intake passage 4. Further, when the engine coolant temperature difference Δ TWCAC, which is the absolute value of the difference between the engine coolant temperature TWCAC and the first target engine coolant temperature TWCMD1, is not higher than the first predetermined value Δ T1, the pump flow rate QEWP of the engine coolant pump 53 is controlled to the minimum flow rate Qmin larger than 0, whereby it is possible to circulate engine coolant while suppressing power consumption by the engine coolant pump 53 as much as possible. This makes it possible to cool intake gases and suppress generation of condensed water in a compatible manner, whereby it is possible to prevent fuel economy from being adversely affected by driving the engine coolant pump.

Further, when the engine 3 is in the outside-EGR region and at the same time in the supercharging region, the pump flow rate QEWP of the engine coolant pump 53 is controlled to the maximum flow rate Qmax irrespective of the engine coolant temperature difference Δ TWCAC, so that intake gases which have been increased in temperature by being pressurized by the turbocharger 11 are cooled to the greatest extent, whereby it is possible to largely enhance the charging efficiency of the intake gases, thereby making it possible to ensure the maximum power output of the engine 3 and improve fuel economy.

Note that the present invention is by no means limited to the embodiment described above, but can be practiced in various forms. For example, although in the present embodiment, the present invention is applied to the gasoline engine, by way of example, the present invention can also be applied to a diesel engine. Further, although the turbocharger driven by exhaust gases is used as a supercharger, by way of example, it is also possible to use a supercharger driven via an output shaft of the engine.

It is further understood by those skilled in the art that the foregoing are preferred embodiment of the invention, and that various changes and modifications may be made without departing from the spirit and scope thereof.

What is claimed is:

1. A cooling control system for an internal combustion engine that includes a supercharger, the cooling control system being provided for cooling intake gases which have been increased in temperature by being pressurized by the supercharger, comprising:
    an intercooler provided in an intake passage of the engine at a location downstream of a compressor of the supercharger, for cooling the intake gases by heat exchange with engine coolant;
    a heat exchanger for dissipating heat from the engine coolant;
    an engine coolant passage connecting between said intercooler and said heat exchanger, for circulating the engine coolant between said intercooler and said heat exchanger;
    an engine coolant pump of the electrically-driven type, which is provided in said engine coolant passage, for delivering the engine coolant to thereby cause the engine coolant to circulate;
    pump control means for controlling an amount of the engine coolant to be delivered by said engine coolant pump;
    engine coolant temperature detection means for detecting a temperature of the engine coolant flowing into said intercooler;
    operating condition detection means for detecting an operating condition of the engine; and
    target temperature-setting means for setting a target temperature of the engine coolant within said intercooler, according to the detected operating condition,
    wherein when a difference between the detected temperature of the engine coolant and the set target temperature is not larger than a predetermined value, said pump control means controls the amount of the engine coolant to be delivered to a predetermined minimum flow rate larger than 0, whereas when the difference is larger than the predetermined value, said pump control means controls the amount of the engine coolant to be delivered such that the amount of the engine coolant to be delivered becomes larger as the difference is larger,
    wherein the engine further includes an EGR device for recirculating part of exhaust gases discharged into an exhaust passage of the engine to an upstream side of the compressor in the intake passage as EGR gases,
    the cooling control system further comprising operating region determination means for determining, based on the detected operating condition of the engine, whether or not the engine a predetermined operating region where recirculation of the EGR gases by said EGR device is not to be performed but supercharging by the supercharger is to be performed,
    wherein when it is determined that the engine is in the predetermined operating region, said pump control means controls the amount of the engine coolant to be delivered to a predetermined maximum flow rate, irrespective of the difference.

* * * * *